Feb. 7, 1967  L. M. EDWARDS ETAL  3,303,461
ACOUSTIC LOGGING APPARATUS WITH DOWNHOLE RECEIVERS
CONTROLLED BY SPACED SWITCHING
Filed Sept. 23, 1963  2 Sheets-Sheet 2

FIG.3

INVENTORS:
LYMAN M. EDWARDS
EDWARD B. TICKELL, JR.

Mason, Kolehmainen, Rathburn & Wyss
ATTYS

United States Patent Office

3,303,461
Patented Feb. 7, 1967

3,303,461
ACOUSTIC LOGGING APPARATUS WITH DOWN-HOLE RECEIVERS CONTROLLED BY SPACED SWITCHING
Lyman M. Edwards and Edward B. Tickell, Jr., Houston, Tex., assignors, by mesne assignments, to PGAC Development Company, Houston, Tex., a corporation of Texas
Filed Sept. 23, 1963, Ser. No. 310,684
18 Claims. (Cl. 340—18)

This invention relates generally to acoustic logging systems and is more particularly concerned with new and useful improvements in systems of the type wherein acoustic energy in the form of spaced apart pulses is transmitted from a transmitting source through the casings or formations adjacent a well bore to one or more receiving points spaced a fixed distance from the source.

In the logging of borehole formations by means of acoustic energy passing through the formations, there are several different types of information that may be useful. Moreover, since the formation conditions vary substantially from well to well or even within the same well it is often difficult to predict with accuracy the particular type of information that is likely to yield optimum results for a given borehole. For example, one type of log that has been used extensively is a conventional velocity log in which the travel times of pulses from the transmitter to a spaced receiver are measured at different borehole depths. Since the spacing is constant any variations in the measured travel times can be attributed to the varying velocities of propagation of the different formations. Such logs have been produced either using a single receiver or using a pair of spaced receivers and measuring the difference between the travel time of the acoustic pulse to the far receiver and the travel time to the near receiver. The two receiver logs possess advantages which are well known in the art.

Other logs, conventionally called amplitude or attenuation logs, are produced by measuring the amplitude of the acoustic pulses arriving at a receiver spaced from the pulse source. U.S. application Serial No. 846,974, filed October 16, 1959 and assigned to the same assignee as the present invention, discloses and claims a system for producing a log representing the difference in amplitude between signals arriving at two spaced receivers. U.S. application Serial No. 181,859, filed March 23, 1962 and assigned to the same assignee as the present invention, discloses and claims a system providing both amplitude and velocity curves which are especially useful in so-called "cement bond" logs for determining the quality of the cement bonding between the borehole formations and the casing in the borehole. A service company may offer to provide any or all of the above-mentioned logs but the customer makes the selection of the log desired. It is, of course, impractical for a company to have separate systems or tools for providing each such service because of the expense involved. Thus, each such tool would require its own truck, its own cable, its own indicating equipment and recorders, etc. For this reason, it would be desirable to provide a single system which may be rendered effective to produce any one of the desired logs or combinations of logs in order to avoid the described duplication of components. Moreover, it would be of great advantage to provide a system in which the changeover from a cement bond log to another type log can be made without removing the downhole tool from the borehole, thus permitting the cased portion of the well to be logged for cement bond and thereafter permitting the uncased or open hole portion to be logged by producing velocity or amplitude curves. Of course, this changeover would also permit reverse operation, that is, the open hole portion could be logged first followed by the cased portion.

In all of the curves or logs mentioned, the spacing between the transmitter and the receiver or receivers affects the quality of the log obtained. Thus, in logging certain formations the quality of the data obtained is enhanced if the spacing is relatively close while other formations are better logged with wider spacings. It is desirable to effectively change the spacing without removing the downhole tool from the borehole in order to facilitate logging different sections of the same borehole with an optimum spacing.

It is an object of the present invention to provide an acoustic logging system employing a transmitter and a plurality of receivers different ones of which may be rendered effective by means of a downhole switching system operated in response to control signals from the surface, thereby to permit changing of the effective spacing between the transmitter and/or the receivers without removing the downhole tool from the borehole.

Another object of the invention is to provide a versatile acoustic logging system which may be rendered selectively effective to provide a wide variety of different curves or logs.

A further object of the invention is to provide an acoustic logging system characterized by the versatility described above without unduly complicating the circuitry involved.

The present invention also concerns new and useful improvements in the electronic circuits of the downhole tool and, particularly, in the circuits for energizing or pulsing the transmitting transducer. More specifically, in prior art systems it has been conventional to use transducer pulsing circuits requiring a high voltage D.C. power supply. Due to the limited physical size of the downhole tool, it is difficult to provide adequate insulation to isolate high voltages from surrounding components. The use of high voltages not only complicates the construction of the conductors, feed-through insulators and the like but it also requires special, expensive design of such components as the capacitors and the power transformers. The latter transformers frequently include the primary winding, one or more high voltage secondary windings and a low voltage filament supply winding for the heaters of the vacuum tubes employed in the downhole circuits. Unless heavy insulation is provided the use of high voltages causes frequent short circuits in these windings. The prior art transducer pulsing circuits generally employ thyratrons which are very fragile and space consuming especially when of a type satisfactory for handling high power. In addition, these thyratrons require dissipation of considerable heat generated by the filament or cathode heating. This complicates the maintenance of stable operating temperatures for the electronic circuits of the downhole tool and, particularly, the firing circuit itself since the firing level of the thyratron or discharge tube varies considerably with temperature, thus changing the pulse rate and the power from the transmitting transducer. The inability to provide proper control over the acoustic energy source has made it difficult to obtain logs which are both reliable and repeatable. The latter problem has also been complicated to some extent by the use of amplifiers in the downhole tool which are non-linear over the dynamic range or frequency range of signals. It is also important to control strictly the power level of the transmitting transducer in order to obtain shear wave logs which are becoming highly desirable.

The present invention, therefore, has for another object the provision of a new and improved acoustic logging system in which the problems discussed above have been solved.

A more specific object of the invention is to provide an acoustic well logging system wherein the transmitting transducer is pulsed from a low voltage, high current source, thus simplifying the design and construction of the downhole tool.

Another object of the invention is to provide a circuit for controlling the transmitting transducer, which circuit provides a uniform firing rate and relatively stable power output from the transducer despite minor fluctuations in supply voltage.

A further object of the invention is to provide a circuit for controlling the transmitting transducer and employing only low voltage components which are not susceptible to damage by vibrations and shock and which do not result in the generation of excessive heat.

The invention has for another object the provision of an amplifier in the downhole tool having a number of step gain positions controllable from the surface to permit selection of the proper amplifier gain for linear operation over a wide dynamic range.

The foregoing and other objects are realized, in accordance with the present invention, by providing an acoustic logging system including a downhole tool connected via a multiple conductor cable to surface measuring and recording equipment. The downhole tool carries a transmitting transducer and three detectors or receiving transducers all oriented in fixed, spaced apart position. The pulsing of the transmitting transducer is accomplished by a new and improved pulsing circuit operating on low voltage and high current, thus simplifying considerably the construction of the downhole tool. This pulsing circuit comprises a relaxation oscillator circuit including a unijunction transistor for periodically exciting the control electrode of a silicon controlled rectifier. Each excitation signal is effective to fire the rectifier in order to discharge a condenser through the transmitting transducer, thus creating an acoustic pulse which is supplied through the borehole fluid to the adjacent earth formations. The condenser and transmitting transducer form an oscillatory circuit which, after a brief period of conduction by the controlled rectifier, is effective to turn off the recifier to condition the pulsing circuit for the next pulse. The pulsing circuit thus employs only components which are of small physical size, relatively immune to shock and vibration, not susceptible to fluctuations due to temperature variations and incapable of producing great quantities of heat. This system results in a more uniform pulsing rate and improved stability of the firing level of the transmitting transducer, thus providing better control of the power level of the acoustic pulse with the result that an accurate shear wave log may be readily obtained. At the same time the repeatability and reliability of the amplitude and velocity logs are enhanced.

The downhole tool further comprises a receiver-switching circuit controlled from the surface equipment for rendering different ones of the detectors effective. This switching circuit is so constructed and arranged that any one of the detectors may be connected individually to the amplifying circuits of the downhole tool while the other two detectors are ineffective, thus permitting three possible spacings of the effective detector from the acoustic wave source. Moreover, the detectors may be rendered effective in different pairs to permit the running of two receiver logs with three different spacings.

A step-gain switch circuit also controlled from the surface equipment may be used to vary the gain of the downhole amplifying circuits through a large number of steps. By the use of the latter switch circuit the gain of the amplifying circuits may be controlled to provide linear response over the dynamic range of signals. The amplifying circuits are connected through the multiconductor cable to the surface recording and measuring equipment which also receives a synchronizing pulse from the transmitter pulsing circuit. The surface equipment may be rendered selectively effective to provide any one of three different type logs in response to the synchronizing pulses and to the acoustic waves arriving at one or more of the detectors as the downhole tool is moved through the borehole. The first such log is a conventional, two receiver, velocity curve recorded by rendering two of the downhole detectors effective and by measuring the travel time of the acoustic wave through the spacing between the two detectors. This is accomplished by obtaining a first signal representing the travel time from the acoustic wave source to the far detector, obtaining a second signal representing the travel time from the source to the near receiver and subtracting the two signals. As was indicated above, three different spacings of the two effective detectors may be obtained by operation of the downhole receiver switching circuit. The second log is a cement bond log of the type described in the above-identified U.S. application Serial No. 181,859 and is recorded by rendering only one of the downhole receivers effective. As is described in detail in the latter application, the cement bond log comprises a conventional, single receiver velocity curve representing the travel time of the acoustic wave to the effective detector and recorded simultaneously with an amplitude curve representing the amplitude of the acoustic energy arriving at that detector. Again, three different effective spacings of the detector from the source can be obtained by operation of the receiver switching circuit. The third log is called a "Satalog," a trademark of the Pan Geo Atlas Corporation, the assignee of the present application, and is recorded with two downhole detectors effective. As is described in detail in the above-identified application Serial No. 846,974, this log comprises a first single receiver amplitude curve representing the amplitude of the acoustic waves arriving at one of the two effective detectors and recorded simultaneously with a second curve representing the difference in amplitude between the acoustic waves arriving at the two effective detectors. Here again, the three different effective spacings of the two active detectors can be obtained by operation of the receiver switching circuit. The changeover from one type of log to another may be made while the downhole tool remains in the borehole. This is particularly advantageous when changing between the cement bond mode and the velocity logging mode because it permits the recording of an open hole velocity or "SATA" log while the downhole tool moves from maximum depth to the surface casing whereupon the cement bond mode can be established from the surface to permit a cement bond log to be made as the tool continues its upward movement. Conversely, the tool may start near the top of the borehole in the cement bond mode while passing downwardly through the surface casing and upon reaching the open hole or uncased portion of the well the velocity of SATA logging modes may be established from the surface.

The invention, both as to its organization and manner of operation, together with further objects and advantages, will best be understood by reference to the following detailed description taken in conjunction with the accompanying drawings wherein.

Figures 1, 2:
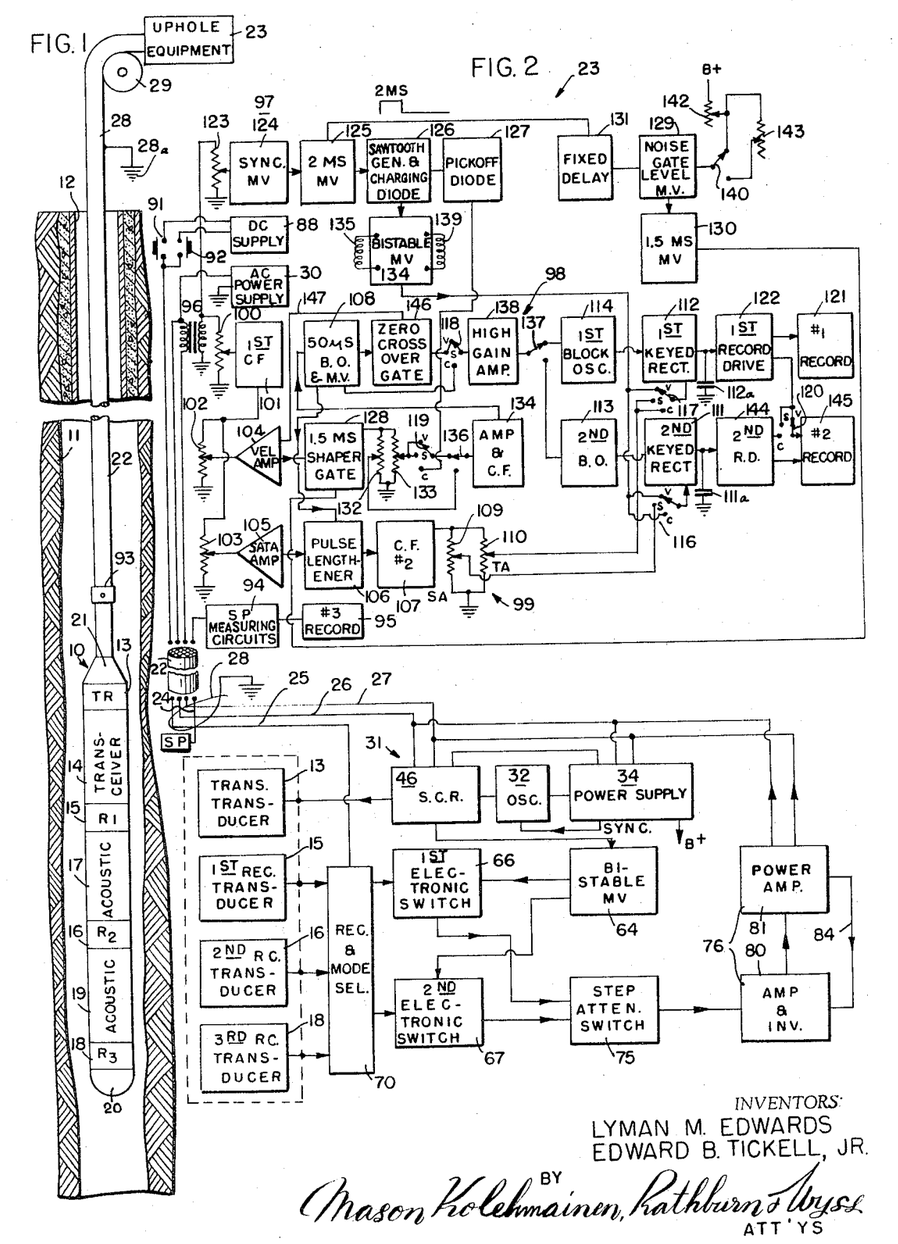
FIG. 1 is a diagrammatic view illustrating a fragmentary portion of the earth's crust with a borehole therein and including a downhole tool and the uphole or surface equipment.
FIG. 2 is a schematic diagram primarily in block form showing surface equipment and a downhole tool characterized by the features of the present invention.

Referring now to the drawings and first to FIG. 1 a well logging system characterized by the features of the present invention is there shown as comprising a downhole tool 10 disposed within a borehole 11 extending into the earth from the surface. While the tool 10 may be used in logging either a completely cased well or an open hole, the upper portion of the borehole 11 is illustrated in FIG. 1 as being cased by a plurality of casing sections 12 secured together in end to end relationship as, for example, by threading one end of each section into the adjacent section. The lower portion of the borehole 11 is illustrated as being an open hole and may contain the usual borehole fluid.

The downhole tool 10 comprises a transmitting transducer or transmitter 13, a transceiver section 14 housing the electronic components of the downhole tool, a first receiving transducer or detector 15, a second receiving transducer or detector 16, an acoustic isolating section 17 which spaces and electrically insulates the detectors 15 and 16, a third receiving transducer or detector 18 and another acoustic isolating section 19 for spacing and electrically insulating the detectors 16 and 18. The downhole tool further comprises a nose piece 20 at the bottom and a cable connector 21 at the top which is secured to a multiple conductor cable 22 extending through the borehole to the surface. The sections of the downhole tool may be housed within generally cylindrical casings provided with threaded couplings (not shown) at both ends and these casings are secured together end to end in well known manner. Suitable electrical connectors are provided between the different sections but these are conventional and, hence, are not shown in the drawings.

The cable 22 may include any number of conductors necessary to provide the desired electrical connections between the downhole tool and the surface equipment identified by the reference numeral 23 in FIG. 1 but in the form shown a cable is employed having four inner conductors 24, 25, 26 and 27 (FIG. 2) insulated from each other and housed within an outer conducting sheath 28. The outer sheath is grounded both in the downhole tool 10 and, as indicated at 28a, at the surface equipment to provide a common ground connection. At the surface the cable 22 is trained over a motor driven sheath 29 which forms part of a suitable means cooperating with the cable to raise or lower the downhole tool 10 within the borehole.

Power for the electronic circuits of the downhole tool is supplied from a conventional 60-cycle A.C. power source 30 in the surface equipment via one of the cable conductors, for example, the conductor 26, or conductors 26 and 27 if phantoming is desired, the return connection, of course, being provided by the grounded outer sheath 28. The power is delivered to the downhole tool by a phantoming circuit similar to that described briefly in the above-identified copending application Serial No. 846,974 but described more fully below.

As is shown in FIG. 2 the transmitting portion of the system includes, in addition to the transmitting transducer 13 referred to above, a pulsing circuit 31 which, in accordance with the present invention, is a synchronized, low voltage, high current source. The transmitting transducer 13 is pulsed by the pulsing circuit 31 to emit pulses at a suitable repetition rate, for example, at a rate of about 15 to 30 pulses per second. In the ensuing description, a repetition rate of 15 pulses per second will be assumed thus providing a period of 66.6 milliseconds between successive pulses. Even with the maximum spacing of the receiver from the transmitting transducer 13 all of the acoustic energy necessary for the production of the velocity and amplitude curves will arrive at the detector within an interval of a few milliseconds following the emission of the acoustic pulse from the transmitting source. As a consequence, the velocity and amplitude measurements are made during the first millisecond of each period so that these first few milliseconds may be referred to as the measuring interval of each cycle. The transmitting transducer 13 and its associated pulsing circuit 31 comprise a means for generating a series of spaced apart acoustic or elastic pulses coupled by the borehole fluid to the borehole formations or to the casing sections 12.

The pulsing circuit 31 includes a relaxation oscillator 32 comprising a unijunction transistor 33 having its operating potential supplied from a low voltage power supply 34. The low voltage power supply is energized by A.C. power supplied from the source 30 via the cable conductor 26, via a transformer 35 and through a conductor 36 to the primary winding 37 of a low voltage power transformer 38. The latter transformer includes a secondary winding 39 connected to a conventional full wave rectifier bridge 40 for developing low voltage D.C. in the order of 300 volts. A filter 41 at the output of the low voltage power supply smooths out the D.C. in conventional manner. The output of the filter 41 is applied to the unijunction transistor 33 and also to the other vacuum tubes of the downhole tool to furnish operating potential. The D.C. output of the bridge rectifier 40 is also applied through a resistor 42 and through a conductor 43 to a pair of parallel connected capacitors 44 and 45 which are in series with the coil of the transmitting transducer 13. These capacitors are charged from the low voltage power supply during each cycle and are rapidly discharged through a silicon controlled rectifier 46 when the latter is rendered conductive by application to its control electrode 47 of an excitation pulse from the relaxation oscillator 32. The excitation pulse from the relaxation oscillator is applied to the control electrode 47 through a coupling capacitor 48 and is developed across a resistor 49 connected between the control electrode and ground.

As was indicated above, the relaxation oscillator 32 is adapted to produce excitation pulses at the rate of approximately 15 cycles per second. Normally, the transistor 33 is maintained non-conductive so that the capacitor 52 is charged by the B+ at the output of the filter 41, the charging current flowing through resistors 53 and 55 and through a potentiometer 54 which may be adjusted to control the firing level of the transistor. The firing rate of the transistor is determined by the potentials on the emitter and the base-two terminal 33a and may be adjusted by the potentiometer 54. The latter potentiometer cooperates with the resistors 53, 55, and 56 to form a voltage dividing network to provide the desired operating potentials for the transistor. To synchronize the firing (control the pulse rate) of the oscillator with the 60-cycle A.C. signal from the power 30 the latter A.C. signal is applied to the base-two circuit from the conductor 36 across a Zener diode 50 which, of course, produces a 60-cycle square wave. The square wave is differentiated across capacitor 51 and is superimposed on the base-two potential. After the unijunction transistor has fired, the capacitor 52 begins to charge slowly thus driving the emitter potential in a positive direction but maintaining the emitter below the level required to cause conduction through the transistor 33. During this period the differentiated 60-cycle wave is applied to the base-two circuit through the capacitor 51 but the first three half cycles have no effect because they arrive at a time when the emitter potential is too negative to permit the A.C. half cycle to drive the transistor into conduction. The fourth half cycle is applied at about the time when the emitter potential approaches the critical or firing voltage level and, hence, this cycle is effective to immediately drive the unijunction transistor 33 into conduction, thus causing the capacitor 52 to discharge rapidly through the base-one terminal 33b and through a relatively small resistor 57 to ground. An output signal or pulse is thus developed across the output resistor 57 for application through the capacitor 48 to the control electrode of the silicon controlled rectifier 46. Thus it will be observed that the pulse of the relaxation oscillator 32 is locked to the 60-cycle power from the source 30 and the pulse rate is a sub-multiple of four of the power frequency.

The signal appearing across the silicon controlled rectifier 46 is used as a synchronizing pulse to correlate the timing of the remaining circuit components in the downhole tool and in the surface equipment 23 with the operation of the transmitting transducer 13. This synchronizing pulse is developed by a capacitor 58 and associated circuit components described below. A diode 60 is connected in parallel with the control rectifier 46 to bypass any negative signals appearing between the anode and cathode of the control rectifier and to damp out any ringing of the transducer. When the silicon control rectifier 46 is excited by a pulse from the relaxation oscillator 32 the rectifier immediately conducts and provides a low resistance discharge path for the parallel connected capacitors 44 and 45. As soon as the rectifier 46 fires the control electrode loses control and the conduction through the rectifier is then controlled by the anode potential. The discharge path for the capacitors 44 and 45 includes, in addition to the silicon control rectifier, the coil or winding of the transmitting transducer 13 and, as a result, a high current is passed through the latter winding to cause the transmitting transducer to create an acoustic pulse or wave which passes through the borehole fluid and is coupled to the earth formations or to the well casing surrounding the transmitting source. This acoustic wave pulse passes through the earth formations or through the casing and back through the borehole fluid to the detectors or receiving transducers 15, 16 and 18. The capacitors 44 and 45 and the winding of the transmitting transducer 13 form an oscillatory circuit which tends to create a negative going signal at the anode of the silicon controlled rectifier. This negative going signal is created after the excitation pulse to the control electrode 47 has terminated and, hence, is effective to cut off the conduction of the silicon controlled rectifier. With the silicon controlled rectifier cut off the capacitors 44 and 45 again begin to charge as a result of current applied from the low voltage source 34 through the resistor 42. At the same time the capacitor 58 begins to charge from the D.C. current applied through the resistor 42. When the silicon controlled rectifier is fired at the beginning of the cycle the capacitor 58 discharges through the latter rectifier, through a resistor 61, through a diode 62, and through a resistor 59. The pulse appearing across the resistor 61 is applied through a coupling condenser 63 to trigger a bistable multivibrator circuit 64 which is described more fully hereinafter. At the same time, a pulse is created across one winding of the transformer 35 in response to current flow through that winding and through a diode 65. The pulse current flow through the winding of the transformer 35 creates a synchronizing signal appearing between the conductors 26 and 27 and this signal is applied to the surface equipment to perform a timing function described more fully hereinafter. One synchronizing pulse is obviously developed each time that the transmitting transducer fires.

In view of the foregoing description it will be recognized that the pulsing circuit 31 illustrated and described is effective to supply acoustic pulses from the transmitting transducer 13 to the surrounding earth formations while using only a low voltage power supply 34. As was indicated above, the elimination of high voltages simplifies the construction of the various components of the downhole system including the capacitors, the feed through insulators, the transformers and the like. Thus, the latter components may be much smaller than those used in high voltage pulsing systems of the prior art and, as a result, the size and weight of the downhole tool may be considerably reduced by utilizing the circuits of the present invention. Moreover, the components described, including the unijunction transistor 33 and the silicon controlled rectifier 46, are themselves of very small size and are relatively immune to shock and vibration so that the downhole tool of the present invention is very rugged in construction.

These components also do not generate great quantities of heat which require dissipation and, as a result, the firing rate and power output of the transmitting transducer may be accurately controlled to obtain a set of logs which are reliable and repeatable. In addition, the accurate control of the power output and firing rate permits an accurate shear wave log to be obtained, a result which is difficult to achieve in the pulsing systems of the prior art. The unijunction transistor 33 is a semi-conductor of great simplicity and requires a minimum number of additional components for the oscillator circuit and these components involve very low power levels. In addition, the unijunction transistor can be readily stabilized at relatively high temperature levels and is very easy to synchronize to any external driving source such as the 60 cycle A.C. source described above. The unijunction transistor produces sufficient current to fire the silicon controlled rectifier despite the fact that it is excited from a low power source. The silicon controlled rectifier 46 has the advantage that it requires no filament or standby power which in the prior art systems is necessary in order to maintain a thyratron or other discharge tube in readiness for firing. The silicon controlled rectifier operates at high power levels while occupying a very small physical space and it is mechanically and physically much more rugged for use in downhole well logging tools than other types of triggering devices heretofore employed. The silicon controlled rectifier has a higher temperature operating range than the thyratrons or gas discharge tubes used in prior art systems and in the present system it offers the additional advantage that it has low dynamic resistance. Very little power and, as a consequence, very little heat is created within the device itself even at relatively high current levels.

The bistable multivibrator 64 is of conventional construction and will not be described in detail. It suffices to say that each synchronizing pulse supplied through the coupling capacitor 63 is effective to drive the bistable multivibrator from one conducting condition to the other. The bistable multivibrator controls a pair of electronic switches 66 and 67 which are, in turn, effective to control the conduction of a pair of receiving channels. The electronic switches 66 and 67 are also of conventional construction and are so connected to the bistable multivibrators 64 that the electronic switch 66 is conducting when the multivibrator is in one of its two conditions while the electronic switch 67 is conducting when the multivibrator is in the other of its conducting conditions. Thus, each of the switches 66 and 67 conducts during alternate cycles. The operation is believed to be obvious in view of the schematic diagram shown in FIG. 3 and, hence, will not be described in detail. The signal input to the control grids of the electronic switches 66 and 67 is applied through a pair of coupling transformers 68 and 69, respectively. These two transformers are, in turn, connected to a six position, four section, remotely controlled stepping switch 70 which forms part of a receiver switching system described more fully hereinafter. The four sections of the stepping switch are respectively identified by the numerals 71, 72, 73 and 74 and each section comprises a rotary arm which may be successively stepped into engagement with six spaced but fixed contacts. For convenience the fixed contacts of each swtich have been identified by the letters A, B, C, D, E and F and, hence, when the rotary arms of all four sections are in engagement with the fixed contacts A this will be referred to as the A position of the stepping switch, etc. The rotary arms of the switch sections 71 and 72 are connected to the opposed ends of the primary winding of the transformer 68 while the rotary arms of the switch sections 73 and 74 are connected to the opposed ends of the primary of the transformer 69. The A, B and C positions of the stepping switch 70 may be referred to as the two receiver positions because when the stepping switch is in any one of these three positions a first receiver is connected to the primary of the transformer 68 while a second and different receiver is connected to the primary of the transformer 69. These three positions are used when running a two receiver velocity log and also when running a "Satalog." The three switch positions permit the operator to change the effective spacing of the two active receivers. The D, E and F positions of the stepping switch may be referred to as the single receiver positions because when the stepping switch is in each of these three positions the same receiver is connected to the primaries of both transformers 68 and 69. These three positions are used during running of the cement bond log and also permit changing of the effective spacing between the source and the active receiver. More specifically, when the stepping switch 70 is in the A position the detector or receiving transducer 15 is connected through the switch sections 71 and 72 to the transformer 68 while the detector or recieving transducer 16 is connected through the switch sections 73 and 74 to the transformer 69. When the stepping switch 70 is in the B position the receiving transducer 15 is connected through the switch sections 71 and 72 to the transformer 68 while the receiving transducer or detector 18 is connected through the switch sections 73 and 74 to the transformer 69. With the stepping switch in the C position the detector or receiving transducer 16 is connected through the switch sections 71 and 72 to the transformer 68 while the detector or receiving transducer 18 is connected through the swtich sections 73 and 74 to the transformer 69. When the stepping switch 70 is in the D position the receiving transducer or detector 15 is connected through the switch sections 71 and 72 to the transformer 68 and is also connected through the switch sections 73 and 74 to the transformer 69. Similarly, when the switch 70 is in the E position the second receiving transducer or detector 16 is connected through the switch sections 71 and 72 to the transformer 68 and is also connected through the switch sections 73 and 74 to the transformer 69. Finally, when the switch 70 is in the F position the third or lowermost receiving transducer 18 is connected through the switch sections 71 and 72 to the transformer 68 and is also connected through the switch sections 73 and 74 to the transformer 69. The electronic switch 66 and 67 when rendered conductive by the bistable multivibrator 64 are effective to supply drive signals from active transducers to a step attenuation switch indicated generally by the reference numeral 75 which controls the gain of an amplifier circuit 76 for transmitting the detected signals to the surface equipment. The step-gain attenuation switch is illustrated as being a 12 position stepping switch having a movable arm 75a engageable in succession with a plurality of spaced fixed contacts. These contacts are interconnected by a series of resistors 77 cooperating to form a voltage dividing network connected across the output of the electronic switches 66 and 67. More specifically, the anodes of the electronic switches are connected together and to the contact numbered 12 of the step gain attenuation switch 75. The resistors 77 are connected in series with each other and with a further plate load resistor 78 which is in turn connected to the output of the filter 41 from the low voltage power supply 34. This series of resistors thus forms the plate load for the electronic switches 66 and 67 and the movable arms 75a determines the amount of signal drive applied through a coupling capacitor 79 to the amplifier 76. The amplifier 76 comprises an input amplifier and phase inverter stage 80 and a conventional power amplifier 81 comprising a pair of vacuum tubes connected in a push pull arrangement. The output of the power amplifier 81 appears across an output transformer 82 which includes a secondary winding 83 having its opposed ends respectively connected to the cable conductors 26 and 27. The output from the amplifier 76 is thus transmitted to the surface equipment 23 for use in driving the measuring and recording equipment described more fully hereinafter. To stabilize the gain of the amplifier 76 there is provided a feed back loop 84 which preferably includes a winding 85 coupled to the transformer 82 and connected to the cathode circuit of the input amplifier and phase inverter 80.

By operation of the stepping switch 75 the gain of the amplifier 76 can be controlled from the surface to provide linear response over a very wide dynamic range of signals. The operation of the stepping switch 70 may also be controlled from the surface to connect the desired detector or detectors to the downhole amplifying equipment and to effectively alter the spacing between the source and the active detector or detectors. The operation of the stepping switches 70 and 75 is controlled by a pair of stepping switch operating coils 86 and 87, respectively, both of which are adapted to be operated by D.C. signals transmitted over the same cable conductor 25 from a D.C. power supply 88 at the surface. More specifically, the operating winding 86 of the stepping switch 70 is connected in series with a diode 89 which is poled to pass only negative current from the conductor 25 to ground while the operating coil 87 for the stepping switch 75 is connected in series with another diode 90 which is poled to pass positive signals from the conductor 25 to ground. D.C. signals of opposite polarity for operating the stepping switches are applied from the D.C. supply 88 through a pair of conventional manually operated switches 91 and 92 at the surface. Thus, when the switch 91 is operated signals of positive polarity are applied via the cable 25 and through the diode 90 to operate the stepping switch 75. Repeated operation of the switch 91, of course, is effective to step the switch 75 through its various positions. Similarly, when the switch 92 is operated D.C. signals of negative polarity are applied via the conductor 25 and through the diode 89 to operate stepping switch 70. Repeated operation of the switch 92 is effective to step the switch 70 through its different step positions.

The control of the stepping switch 75 from the surface permits the gain of the downhole amplifying equipment to be effectively changed without removing the tool from the borehole in order to obtain the linear response referred to above. Since the switch 70 may also be controlled from the surface the effective spacing of the detectors may be altered without removing the tool from the borehole and, in addition, the amplifying equipment of the downhole tool may be supplied with signals either from a single one of the detectors or from any desired pair of the detectors so that the downhole tool may be conditioned for any desired type of log without removing the tool from the borehole.

A self-potential electrode 93 is preferably carried by the cable 22 at a position spaced from the cable connector 21 for the purpose of gathering natural earth potentials in a manner which is well known in this art. The self-potential electrode is preferably connected via the cable conductor 24 to a set of self-potential measuring circuits 94 which drive a recorder 95. The recorder 95 may be of any conventional type and includes a recording medium driven simultaneously with the raising or lowering of the downhole tool 10 within the borehole so that the self-potential or natural earth potentials are recorded as a function of depth of the downhole tool. The synchronizing pulse and the output of the amplifier 76 appearing between the conductors 26 and 27 are used at the surface to develop either a conventional two receiver velocity log, a SATA log of the type described above wherein a single receiver amplitude curve is recorded simultaneously with a curve representing the difference in amplitude between signals arriving at the two active detectors, or a cement bond log wherein a single receiver velocity log is recorded simultaneously with a single receiver amplitude log. As was indicated above, the cement bond log can be produced only when the stepping switch 70 is in one of the single receiver positions, i.e., D, E or F, while the other two logs can be produced only when the stepping switch is in one of the two-receiver positions, i.e., A, B or C. The surface equipment is conditioned to provide the desired log by a manually operated mode selector switch having five switch sections 116, 117, 118, 119 and 120 each including a rotary arm movable to three different positions, namely, a "Velocity" log position marked V in FIG. 2, a "Satalog" position marked S and a "Cement Bond" position marked C.

Let it first be assumed that the mode selector switch is in the "Cement Bond" position and that the stepping switch 70 is in one of its D, E or F positions to connect only one of the detectors 15, 16 or 18 to the electronic switches 66 and 67. The circuitry at the surface for producing the cement bond log is similar to that described in the above-identified copending Summers application Serial No. 181,859. Thus, at the surface the synchronizing pulse and the output of the amplifier 76 are applied to a coupling transformer 96 having its secondary connected to supply drive signals for a timing channel 97, a velocity measuring channel 98 and an amplitude measuring channel 99. The timing channel 97 functions to gate both the amplitude measuring channel and the velocity measuring channel so that these channels are not triggered by spurious noises or the like and, hence, respond only to signals arriving at the downhole detectors from the transmitting transducer 13. In addition, the timing channel 97 and the velocity measuring channel 98 cooperate to provide the velocity or travel time measurements used in producing the two receiver velocity log referred to above and in producing the velocity curve of the cement bond log. The timing channel 97 cooperates with the amplitude measuring channel 99 to provide the amplitude measurements used in making both the "Satalog" referred to above and the amplitude curve of the cement bond log. More specifically, the output of the transformer 96 is applied across a gain control potentiometer 100 which is in turn connected to a first cathode follower 101 of conventional construction. The cathode follower functions to isolate the velocity channel 98 and the amplitude channel 99 from the timing channel and from the amplifier of the downhole tool. The output of the cathode follower 101 is applied across a velocity gain potentiometer 102 which controls the magnitude of the input signal to the velocity channel 98 and this output is also applied across an amplitude gain potentiometer 103 which controls the amplitude of the input signal to the amplitude measuring channel 99. The potentiometers 102 and 103 provide drive signals for a pair of amplifiers 104 and 105, respectively, of conventional construction. In running the two receiver logs, during each alternate cycle when the near detector (15 or 16) is connected to the amplifier 76, the amplifiers 104 and 105 both receive the signals arriving at that detector from the source 13. However, during each cycle when the far detector (16 or 18) is connected to the amplifier 76, the amplifiers 104 and 105 are excited by signals received by that detector. When running the single receiver cement bond log one detector is connected to the amplifier 76 during all cycles and, as a result, the amplifier 105 provides drive signals for a pulse lengthener 106 and cathode follower 107 cooperating with a blocking oscillator and multivibrator 108 to provide a D.C. pulse for making the amplitude measurement. More specifically, the circuits 106, 107 and 108 are identical to the similarly entitled circuits described in detail in the copending application Serial No. 846,974 referred to above. Thus, the pulse lengthener 106 and cathode follower 107 are identical to the circuit identified in the copending application by the reference numeral 171 and shown in detail in FIG. 4 of that application. The multivibrator and blocking oscillator 108 are identical to the circuit 167 and to the blocking oscillator A or B shown in the copending application. As will be evident from the detailed description in the latter application, the pulse lengthener and cathode follower cooperate to develop an output which is proportional to the first excursion of the signal arriving at the active detector in a predetermined direction, for example, in a positive direction. The blocking oscillator and multivibrator 108, which are triggered in a manner described more fully below to gate the amplitude channel 99 on for a very brief period during each cycle, provide a rectangular wave output having a duration which is preferably very short, for example, in the order of 50 microseconds. The duration of the 50 microsecond wave is sufficient to embrace the period during which the desired signals such as the signals passing through the casing 12 will arrive at the receiver and this 50 microsecond wave is effective to render the pulse lengthener 106 and cathode follower 107 effective to develop a lengthened pulse output having an amplitude proportional to the first positive excursion of the signal detected by the active receiver and having a pulse width corresponding to the duration of the 50 microsecond wave from the multivibrator and blocking oscillator 108. The lengthened pulse output from the cathode follower 107 is applied to a pair of ratio potentiometers 109 and 110. The potentiometer 109 supplies drive signals for a second keyed rectifier 111 only when the mode selector switch is in the "Satalog" position. The potentiometer 110 supplies drive signals to a first keyed rectifier 112 when the mode selector switch is in both the "Satalog" and "Cement Bond" positions. Each of these keyed rectifier circuits 111 and 112 is of the type identified by the reference numeral 32 in U.S. Patent No. Re. 24,446. Each of the keyed rectifier circuits comprises a pair of triodes (not shown) for charging a storage capacitor 111a or 112a to a voltage proportional to the amplitude of the D.C. signal applied through the switch sections 116 and 117 in a manner which will be understood by reference to the above-identified application Serial No. 181,859. If the amplitude of the D.C. drive signal is lower than the then existing voltage on the storage capacitor one of the triodes conducts during the positive half cycles of the A.C. signal applied to its grid so that the capacitor discharges to the lower level of the D.C. input signal. If, on the other hand, the D.C. input signal is greater than the voltage on the storage capacitor 111a or 112a the other triode conducts during the positive half cycles of the A.C. signal applied to its grid thus charging the storage capacitor to the higher voltage level of the input signal. The A.C. signal supplied to the keyed rectifier 111 is derived from a blocking oscillator 113 while the A.C. signal applied to the keyed rectifier 112 is derived from a blocking oscillator 114. The voltage across the storage capacitor 112a when the cement bond log is being run is proportional to the amplitude of the pulse output of the cathode follower 107. The voltage appearing across the storage capacitor 112a is applied to a first recorder drive 122 of a conventional oscillograph recorder which may include a plurality of recording galvanometers. One of the recording galvanometers or recording devices is identified by the reference numeral 121 and is controlled by the recorder drive 120 to deflect a light beam impinging upon a sensitized recording medium driven past the beam simultaneously with the raising or lowering of the downhole tool 10 within the borehole. The amount of deflection of the beam of the recording device 121 is proportional to the voltage across the storage capacitor 112a and, as a result, the device 121 develops a first continuous curve representing as a function of depth the amplitude of the first positive excursion of the signal arriving at the active detector 15, 16 or 18. The recorder drive 122 may also be used to control a recording pen or stylus acting upon a recording medium. In either case, the recorder drive 122 is effective to develop a curve representing the amplitude of signals arriving at the effective detector from the transducer 13 and this record may, if desired, be calibrated in terms of attenuation in view of the fact that the amplitude of the detected signal is inversely proportional to the attenuation introduced by the earth formations or by the casing. By appropriate changes in polarities of the various circuits the recorder drive 122 could, of course, be made responsive to the amplitude of the first negative excursion of the detected signal.

Turning next to the time channel 97, it will be observed that this channel comprises a sync gain potentiometer 123 for controlling the amplitude of the synchronizing pulse applied to a conventional synchronizing multivibrator 124 which develops a spike or pulse in response to the synchronizing signal from the downhole tool. The latter pulse triggers a multivibrator 125 of the type shown in U.S. Patent No. Re. 24,446 which, in turn, develops a square wave output for application to a saw tooth generator 126 and to a noise gate level circuit described more fully hereinafter. The duration of the square wave from the multivibrator 125 is equal to the measuring interval and is in excess of the time required for the acoustic energy to travel from the source 13 to the far receiver 18 even through formations having very low velocities of propagation. To this end, a 2 millisecond square wave is preferred. Preferably, the saw tooth generator 126 is a conventional boot strap saw tooth generator of the type described in U.S. Patent No. Re. 24,446 for producing a saw tooth wave having its initial rise beginning with the synchronizing pulse and continuing to rise linearly throughout the two millisecond duration of the square wave from the multivibrator 125. When the saw tooth reaches a predetermined amplitude it becomes sufficient to trigger a pick off control circuit 127 to develop a sharp timing spike or pulse for triggering the blocking oscillator and multivibrator 108 when the mode selector switch is in the "Cement Bond" position. The triggering pulse or spike of the blocking oscillator and multivibrator 108 is produced at a predetermined but adjustable time following the firing of the transmitter 13 and this time is pre-set so that it is slightly shorter than the time required for the acoustic energy to pass from the transmitter 13, through the borehole fluid, through the casing and back through the fluid to the active detector. Since the casing travel time is about 58 microseconds per foot and the travel through the borehole fluid is about 200 microseconds per foot a four foot transmitter to receiver spacing in a six inch diameter casing with three inch transducers will require a pre-set time of about 280 microseconds. Other spacings and/or different diameter casings will, of course, require a change in the pre-set time between the transmitter pulse and the development of the spike for initiating operating of the blocking oscillator and the multivibrator 108. One form of pick off control which could be used to perform the functions described is illustrated and described in the above-identified application Serial No. 181,859. Since the operation of this pick off circuit is believed to be obvious from the detailed description in the latter application it suffices to say that the spike or triggering pulse for the blocking oscillator and multivibrator 108 is effective to cause the latter circuit to develop a 50 microsecond square wave beginning at a time coincident with the spike from the pick off circuit, that is, at a predetermined time following the synchronizing pulse. The duration of the square wave from the circuit 108 is sufficient to permit measurement of the amplitude of the first positive excursion of the casing signal arriving at the effective downhole detector. However, pulses traveling through the earth formations at a velocity equal to or slightly greater than the velocity of the casing signals, that is, those signals which arrive during the duration of the square wave from the circuit 108 may affect the amplitude measurement. The pulse lengthener and the cathode follower obviously do not respond to signals arriving at the detector prior to the generation of the spike from the pickoff circuit nor do they respond to signals arriving after the square wave from the circuit 108 and, as a result, the keyed rectifier circuits are not triggered by noises or spurious signals occurring during these periods.

Considering next the operation of the velocity measuring channel 98 to produce the velocity curve for the cement bond log, it will be observed that this channel includes, in addition to the amplifier 104 referred to above a gate circuit 128 of the type disclosed in U.S. Patent No. 2,862,104. The latter gate circuit is supplied with a square wave gating signal from the noise gate circuit, which preferably comprises a monostable multivibrator 130 of the type shown in U.S. Patent No. Re. 24,446. The multivibrator 130 is excited by the square wave output of a noise gate level multivibrator 129 which, in turn, is triggered by the square wave from the two millisecond multivibrator 125 but the latter square wave is first passed through a delay circuit 131 to delay the start of the signal for the multivibrator 130 for a fixed period following the synchronizing pulse. The delay circuit portion of the noise gate may be of the type identified by the reference numeral 25 in U.S. Patent No. 2,768,701. The gated circuit 128 is nonconductive until it receives the square wave gating signal from the multivibrator 130 and, hence, during the delay period provided by the circuit 131 no signals are passed to the output terminals of the gated circuit 128. The gating signal from the multivibrator 130 has a duration of about 1.5 milliseconds and signals detected during this 1.5 millisecond period are passed by the signal gate 128 which acts to develop at its output terminal signals of only one polarity, for example, positive going signals. The latter signals are passed to a pair of pick gain control potentiometers 132 and 133 connected in parallel. The output of the potentiometer 132 is applied during alternate cycles to an amplifier and cathode follower 134 of conventional construction, which, in turn, drives the blocking oscillator and multivibrator circuit 108. To effect this alternate operation, the saw tooth output of the saw tooth generator and charging diode circuit 126 is applied to a conventional bistable multivibrator 134 which is triggered once during each cycle to change its operation from one conducting condition to the other. The saw tooth wave is applied to the input of the first keyed rectifier circuit 112 when the switch section 117 is in the "Velocity" position and is also applied to the second keyed rectifier circuit 111 both when the switch section 116 is in the "Velocity" position and when it is in the "Cement Bond" position. When the bistable multivibrator 134 is in the first of its two conducting conditions it is effective to pass current through the operating coil 135 of a cycle control relay having a pair of contact sets 136 and 137. The contact set 136 controls the input to the amplifier and cathode follower circuit 134 and, in the normal position shown in FIG. 2 with the relay coil 135 deenergized, the input to the amplifier cathode follower circuit 134 is derived from the potentiometer 132. When the relay coil 135 is energized the relay contacts 136 drive the amplifier and cathode follower circuit 134 from the signal passed by the switch section 119. With the mode selector switch in the "Cement Bond" position the latter signal is derived from the pick off circuit 127 but in the "Velocity" and "Satalog" positions the drive signal is taken from the potentiometer 133. The relay contact set 137 supplies the output of a high gain amplifier circuit 138 either to the first blocking oscillator 114 or to the second blocking oscillator 113 depending upon whether the relay coil 135 is energized or deenergized. Thus, when the relay coil 135 is deenergized the contact set 137 supplies excitation to the blocking oscillator 114 from the output of the high gain amplifier 138 but, when the relay coil 135 is energized, the contact set 137 supplies the output of the high gain amplifier 138 to the second blocking oscillator 113. The bistable multivibrator 134 also controls the operation of a second relay 139 having a set of relay contacts 140 providing the input to the noise gate level control 141. The relay 139 is energized alternately with the coil 135, that is, when the bistable multivibrator 134 is in the second of its conducting conditions. When the relay 139 is deenergized the relay contacts 140 supply a noise gate control multivibrator 129 with a drive signal derived from a potentiometer 142 but when the relay coil 139 is deenergized the contacts 140 deliver the D.C. appearing across a second potentiometer 143 to the noise gate control. The noise gate multivibrator 129 is triggered on by the output of the delay circuit 131 and produces a rectangular wave having a duration which may be varied by adjusting the potentiometers 142 and 143. The multivibrator 130 is triggered on by the trailing edge of the rectangular wave from the multivibrator 129 and, hence, the start of the 1.5 millisecond gate signal is, in effect, dependent upon the duration of the wave from the multivibrator 129. In running the cement bond log, the amplitude and velocity measurements are made during alternate cycles. The velocity measurements are made during those cycles when the relay coil 139 is energized. The potentiometers 142 and 143 are so adjusted that the start of the 1.5 millisecond gate signal is delayed for a period almost as great as the travel time of the pulse from the transmitter 13 to the active detector 15, 16 or 18. In running the two receiver velocity log and the Satalog different detectors are effective during alternate cycles. The potentiometer 142 adjusts the duration of the square wave from the multivibrator 129 so that the 1.5 millisecond gate signal begins at the proper time for the receiver that is active during the cycles when the relay coil 139 is deenergized. Thus, the setting of the potentiometer 142 is determined to some extent by the spacing between the source 13 and the latter receiver. Similarly, the potentiometer 143 is adjusted to control the start of the 1.5 millisecond gate signal during the cycles when the other receiver is active and, as a consequence, its setting is determined by the spacing between the source and the latter receiver.

With the mode selector switch in the "Cement Bond" position the keyed rectifier circuit 111 is supplied with the linear saw tooth wave output of the generator 126. The A.C. signal for the latter keyed rectifier circuit is derived from the blocking oscillator 113 which is triggered from the output of the high gain amplifier 138. During each cycle when the relay coil 135 is energized, the blocking oscillator 113 is, in effect, triggered by the signal appearing across the potentiometer 132 which, in turn, represents the signals arriving at the active detector. More specifically, during the alternate cycles when the velocity measurement is being made the relay coil 135 is energized and the unidirectional signals appearing across the potentiometer 132 are applied through contacts 136 to the amplifier and cathode follower 134. The signal output of the latter circuit triggers the blocking oscillator and multivibrator 108 to develop a pulse which is passed through the switch section 118, through the high gain amplifier 138 and through the contacts 137 to the blocking oscillator 113. The blocking oscillator provides the A.C. drive signals for the keyed rectifier 111 to make the velocity measurement. As was indicated above the keyed rectifier circuit 111 is identical to that disclosed in the above-identified Patent No. Re. 24,446 and is effective to control the charging and discharging of the storage capacitor 111a connected across its output. As will be evident from an understanding of the latter patent the blocking oscillator 113 triggers the keyed rectifier circuit 111 to charge the storage capacitor to a level corresponding to the amplitude of the saw tooth wave at a time corresponding to the instant of first arrival of the pulse from the transmitter 13 at the active detector of the downhole equipment. During the succeeding velocity measuring periods if the first arrival at an active detector occurs earlier than the previous one, thus indicating a higher velocity of propagation, the saw tooth wave will have reached a lower level at the time when the blocking oscillator 113 is triggered so that the storage capacitor of the keyed rectifier circuit 111 discharges to a somewhat lower level. Conversely, if the first energy takes longer to reach the active detector the charge on the storage capacitor is increased to a higher level. Thus, the voltage across the storage capacitor of the keyed rectifier circuit is proportional to the time expiring between the transmission of a pulse from the transmitting transducer 13 and the arrival of the first portion of the resulting energy at the active detector. This voltage is applied to a recorder drive 144 which drives a recording galvanometer or other recording device 145 to develop a second curve representing the velocity of propagation of the various earth formations or the casing as the downhole tool is moved. Since the blocking oscillator 113 is triggered by the initial portion of the energy arriving at the active receiver, the velocity curve represents the travel time or velocity of the pulses passing through the borehole casing except for those borehole depths where the borehole formations have a higher velocity of propagation than the steel casing. The recorder 145 is preferably a second recording galvanometer and develops its curve upon the same recording medium and directly alongside the amplitude curve produced by the device 121. These two curves, when compared, facilitate the analysis of the quality of the cement bond between the casing 12 and the walls of the borehole as will be evident in view of the detailed description in the above-identified application Serial No. 181,859.

When the mode selector switch is in the "Velocity" position, the recorder drive 144 and the recording device 145 are effective to produce a conventional two receiver velocity curve. Thus, when a two receiver velocity curve is desired the downhole stepping switch 70 is placed in one of the two-receiver positions, namely, the A, B or C position depending upon the desired spacing of the two receivers from the transmitting source. With two receivers alternately active during successive cycles, signals are transmitted to the surface equipment where the synchronizing signal energizes the timing channel 97 in the manner indicated above while the detector signals arriving during all cycles are passed through the amplifier 104 and through the signal gate 128. The latter gate is opened by the 1.5 millisecond gating signal from the multivibrator 130 but this gating signal may start at slightly different times during the successive cycles as a result of the alternate making and breaking of the contacts 140 as was described above. The signals developed by the gate 128 are applied through the switch section 119 to the amplifier and cathode follower 134. During those cycles when the near receiver (15 or 16) is active, the relay coil 135 is energized and, as a result, the contacts 136 drive the amplifier and cathode follower 134 from the signal appearing across the potentiometer 133 which may be adjusted to control the amplitude of the drive signal provided by the near receiver. During those cycles when the far receiver is active, the coil 135 is deenergized and the drive signal for the amplifier and cathode follower 134 is taken from the potentiometer 132 which may be adjusted to control the drive provided by the far receiver. These drive signals are used to trigger the circuit 108 which in turn provides an input signal for a zero crossover gate 146. This gate may be of the general type disclosed in India Patent No. 69,063 published January 14, 1961, and provides a signal in response to crossing of the zero or reference axis by a voltage varying with time. A circuit of this type is also disclosed in chapter II, pages 2-6 and 2-7 of the "Principles of Radar" published by McGraw-Hill Book Company and authored by the staff of the Radar School of the Massachusetts Institute of Technology. The zero crossover gate is also supplied via a conductor 147 with signals directly from the output of the velocity amplifier 104 and functions to produce a D.C. pulse output in response to the first excursion or zero crossover of the signal arriving at the downhole detector. The output signal from the zero crossover gate 146 is passed through section 118 of the mode selector switch and is amplified by the high gain amplifier 138. During the cycles when the near receiver is effectively connected to the downhole amplifier 76, the relay coil 139 is deenergized and the output of the high gain amplifier 138 is passed through the relay contacts 137 to the first blocking oscillator 114. The latter blocking oscillator supplies A.C. signals to the first keyed rectifier 112 simultaneously with the sawtooth wave from the generator 126 and, hence, the storage capacitor 112a is charged to a level proportional to the travel time of the acoustic pulse from the transmitting source to the near receiver. During the next succeeding cycle of operation, the relay coil 139 is energized and the far receiver is effectively connected to the downhole equipment. With the relay coil 139 energized the relay contacts 137 supply the output of the high gain amplifier 138 to the blocking oscillator 113 which develops an A.C. signal for driving the keyed rectifier 111. The latter rectifier is also supplied with the saw tooth output from the generator 126 and, hence, the storage capacitor 111a is charged to a level proportional to the travel time of the acoustic pulse from the transmitter transducer 13 to the far receiver. The D.C. signal developed by the keyed rectifier 111 is applied to the recording device 145 simultaneously with the D.C. signal from the keyed rectifier 112, the latter signal being applied through the switch section 120 when the mode selector switch is in the "Velocity" position. The recording device 145 effectively subtracts the D.C. signal appearing across condenser 112a from that appearing across condenser 111a and drives the recording galvanometer in accordance with the difference therebetween. Since the difference between the two D.C. signals is effectively equal to the travel time of the acoustic wave through the spacing between the two active receivers, the recorder 145 provides a conventional, two receiver, velocity log.

With the mode selector switch in the "Satalog" position and with the downhole stepping switch 70 in one of its two receiver logging positions, that is, in either the A, B or C position, the electronic switches 66 and 67 are alternately effective to supply the outputs of the two active receivers to the downhole amplifier 76 so that during the first cycle of operation the output of one of the receivers, for example, the near receiver is applied by the amplifier to the surface equipment while during the next succeeding cycle the output of the far receiver is supplied by the amplifier 76 to the surface equipment. The synchronizing pulses excite the timing channel 97 in the manner indicated above while the outputs from the two receivers during their respective operating intervals are supplied through the amplifiers 104 and 105 to the channels 98 and 99. The D.C. pulse appearing across the potentiometer 110 is applied to the keyed rectifier 112 through the switch section 117. The keyed rectifier 112 is supplied with A.C. signals from the blocking oscillator 114 during those intervals when the near receiver is active, i.e., when the relay coil 139 is deenergized. More specifically, during those cycles when the coil 139 is deenergized the signal appearing across the potentiometer 133 is passed through the switch section 119 and through the contacts 136 to the amplifier and cathode follower 134. The unidirectional signal output of the latter circuit triggers the blocking oscillator and multivibrator 108 to produce a 50 microsecond pulse beginning with the first arrival at the near receiver. This pulse is applied to the zero crossover gate circuit 146 which is also supplied with detected signals from the amplifier 104. As was indicated above, the gate 146 develops a pulse at the exact instant when the detected signal first crosses the zero axis following application of the 50 microsecond gate signal from the circuit 108. The pulse from the gate 146 is passed through the switch section 118, through the high gain amplifier 138 and through the contacts 137 to the blocking oscillator 114 to provide the A.C. drive signal for the keyed rectifier 112 during those cycles when the near receiver is effective. The potentiometer 110 may be adjusted to control the drive effectively produced by the near receiver. The keyed rectifier 112 produces across its output storage capacitor 112a a D.C. signal representing the amplitude of the first positive excursion of the signals arriving at the near receiver. The keyed rectifier 112 thus drives the first recorder drive 122 to cause the recording device 121 to produce a conventional, single receiver, amplitude curve in the manner described above. The D.C. pulse appearing across the potentiometer 109 is applied to the keyed rectifier 111 through the switch section 116. During the second or alternate measuring intervals when the relay coil 139 is energized and the far receiver is active the output of the high gain amplifier 138 is applied to the second blocking oscillator 113 so that the latter oscillator supplies A.C. signals for the second keyed rectifier. More specifically, during those cycles when the coil 135 is energized the signal appearing across the potentiometer 132 is passed through the contacts 136 to the amplifier and cathode follower 134 which triggers the blocking oscillator and gate 108 in the manner described above. The 50 microsecond gate signal from the circuit 108 is applied to the zero crossover gate 146 simultaneously with the signal from the amplifier 104 applied via the conductor 147. The zero crossover gate functions to produce a pulse in response to the first crossover of the zero axis by the detected signal and this pulse passes through the switch section 118, through the high gain amplifier 138 and through the relay contacts 137 to the second blocking oscillator 113 to develop the A.C. drive signal for the keyed rectifier 111. The latter rectifier thus produces across its output storage capacitor 111a a D.C. signal representing the amplitude of signals arriving at the far receiver during each of the second measuring intervals. The potentiometer 109 may be adjusted to control the drive effectively produced from the far receiver. This signal is applied through the circuit 144 to the second recorder 145 where it is compared with the signal supplied from the output of the first keyed rectifier through the switch section 120. The second recorder is driven in accordance with the difference between the two D.C. signals appearing across capacitors 111a and 112a and, hence, provides a difference in amplitude curve representing the difference in amplitude between signals arriving at the near and far receivers. The amplitude curve and the difference in amplitude may be expressed in terms of attenuation or in terms of attenuation per foot of spacing as is described in the above-identified copending application Ser. No. 846,974.

In view of the foregoing description it will be recognized that the mode selector switch may be set to any one of its three positions to select the particular type of log desired. In addition, the selector switch 70 may be controlled from the surface to effect the desired receiver spacing and also to connect either a single receiver or a pair of receivers to the downhole amplifier 76. Thus, it is possible, through selective energization of the stepping switch 70 and through control of the mode selector switch, to establish any one of the three desired logging modes from the surface and without removing the tool from the borehole. As was indicated above, this permits the downhole tool to be raised through the open hole portion of the borehole 11 with the mode selector switch in either the "Velocity" or "Satalog" positions and with any desired pair of receivers connected to the downhole amplifier. Thus, either a conventional two receiver velocity log or a Satalog can be run through the open hole portion of the borehole. When the tool reaches the upper or cased portion 12 the mode selector switch can be thrown to the "Cement bond" position and the stepping switch 70 can be operated to connect any desired one of the three receivers to the downhole amplifier thus conditioning the equipment for running a cement bond log. Alternatively, of course, the downhole tool may be lowered through the upper portion of the borehole with the mode selector switch of the surface equipment in the cement bond position and the stepping switch 70 conditioned to connect only one detector to the amplifier 76 so that the quality of the cement bond can be determined while the downhole tool moves through the cased portion of the borehole. When the tool reaches the open hole portion of the borehole 11 the selector switch 70 and the mode selector switch may be utilized to produce either the velocity log or the Satalog in the manner described above. This can be accomplished without removing the tool from the borehole.

Figure 3:
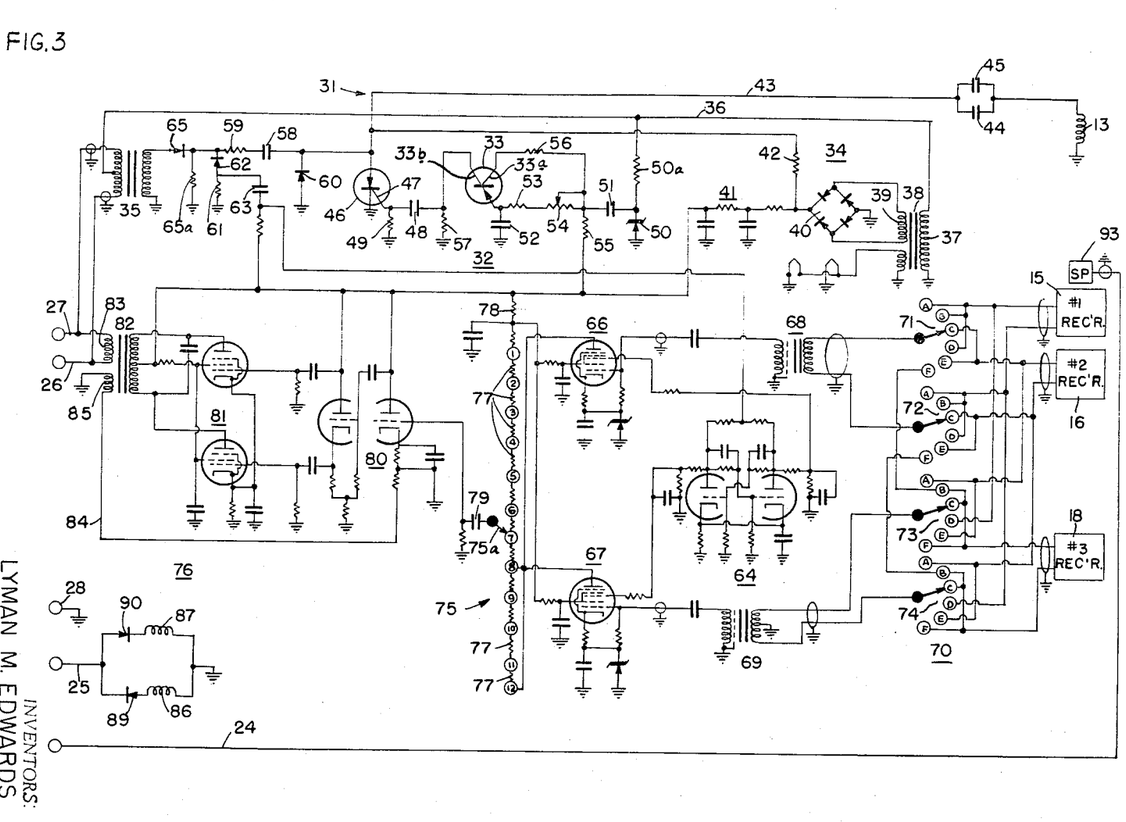
FIG. 3 is a schematic diagram showing the downhole tool of the equipment illustrated in FIG. 2.

The pulsing circuit shown in FIG. 3 may be constructed using the following components although it should be understood that these values are provided solely to complete the disclosure and not with the intent to limit the invention thereto:

| | | |
|---|---|---|
| Transistor 33 | Type 2N–1671B | |
| Controlled rectifier 46 | Type 2N–638A | |
| Diodes 60, 62 and 65 | Type DI–56 | |
| Zener diode 50 | Type PSI 6319 | |
| Resistor 49 | kilohms | 1 |
| Resistors 50a and 53 | do | 51 |
| Resistor 55 | do | 75 |
| Resistor 56 | do | 620 |
| Resistor 57 | do | 47 |
| Resistor 57 | do | 68 |
| Resistor 61 | do | 100 |
| Resistor 65a | do | 220 |
| Potentiometer 54 | kilohms end to end | 500 |
| Condensers 44 and 45 | microfarads | 2 |
| Condenser 48 | do | .2 |
| Condensers 51 and 63 | do | .01 |
| Condenser 52 | do | .25 |
| Condenser 58 | do | .068 |

While the invention has been described in conjunction with an illustrative embodiment, it will be understood that many modifications would readily occur to those skilled in this art and it is, therefore, contemplated by the appended claims to cover any such modifications as fall within the true spirit and scope of the invention.

What is claimed as new and desired to be secured by Letters Patent of the United States is:

1. In an acoustic well logging system of the type comprising a downhole tool for insertion into a borehole; surface equipment; a cable connected between said downhole tool and said surface equipment; the improvement which comprises a transmitting transducer in said downhole tool having an energizing winding, a low voltage D.C. power supply in said downhole tool, an A.C. source in the surface equipment connected via said cable to said low voltage power supply, storage capacitor means connected to said low voltage power supply and in series with said winding, a controlled rectifier having its anode and cathode connected in series with said capacitor means and said winding, said rectifier also having a control electrode, a relaxation oscillator having an output circuit connected to supply pulses to said control electrode to fire said controlled rectifier, said oscillator having an input circuit connected to said A.C. source to supply triggering signals to cause said oscillator to emit pulses at a rate which is an integral submultiple of the frequency of A.C. current from said A.C. source, said storage capacitor means being charged by said low voltage power supply during each of the periods between successive firings of said rectifier, and said storage capacitor discharging through said rectifier and through said winding when said rectifier fires.

2. In an acoustic well logging system of the type comprising a downhole tool for insertion into a borehole; surface equipment; a cable connected between said downhole tool and said surface equipment; the improvement which comprises a transmitting transducer in said downhole tool having an energizing winding, a low voltage D.C. power supply in said downhole tool, an A.C. source in the surface equipment connected via said cable to said low voltage power supply, storage capacitor means connected to said low voltage power supply and in series with said winding, a controlled rectifier having its anode and cathode connected in series with said capacitor means and said winding, said rectifier also having a control electrode, a relaxation oscillator circuit including a transistor having an output electrode connected to supply pulses to said control electrode to fire said controlled rectifier, said transistor having an input electrode connected to said A.C. source to supply triggering signals for said oscillator circuit to cause said circuit to emit pulses at a rate which is an integral submultiple of the frequency of A.C. current from said A.C. source, said storage capacitor means being charged by said low voltage power supply during each of the periods between successive firings of said rectifier, and said storage capacitor means discharging through said rectifier and through said winding when said rectifier fires, whereby said transducer emits a pulse of acoustic energy.

3. The apparatus defined by claim 2 wherein said transistor is a unijunction transistor having an emitter, and first and second base terminals, said first base terminal forming said output terminal, said emitter forming said input electrode, a voltage divider network connecting said emitter and said second base terminal being connected to said low voltage power supply, and said network including an adjustable resistance for controlling the D.C. potential of said emitter and said second base terminal to control the pulse rate of the oscillator.

4. In an acoustic well logging system of the type comprising a downhole tool for insertion into a borehole; surface equipment; a cable connected between said downhole tool and said surface equipment; means cooperating with said cable to raise and lower the tool within the borehole; said downhole tool comprising a source of acoustic wave energy including a transmitting transducer having an energizing winding, and a plurality of receivers spaced from said source in a direction extending longitudinally of the borehole; and signal translating means including said cable for transmitting signals detected by said receivers from said downhole tool to said surface equipment, the improvement which comprises switching means for rendering said translating means effective, means including a switch operated from the surface for controlling the operation of said switching means to render the translating means effective to transmit the signals detected by only one of said receivers or to render the translating means effective to transmit the signals detected by a pair of said receivers, said surface equipment including a first recording means connected to the cable and responsive to signals detected by said one receiver for producing a first log as said tool is moved through the borehole with said translating means effective to transmit signals detected by one receiver, said surface equipment including second recording means connected to said cable and responsive to signals detected by said pair of receivers for producing a second log as said tool is moved through the borehole with said translating means effective to transmit signals detected by said receivers, means in the surface equipment for selectively rendering said first and second recording means operative, a low voltage D.C. power supply in said downhole tool, an A.C. source in the surface equipment connected via said cable to said low voltage power supply, storage capacitor means connected to said low voltage power supply and in series with said winding, a controlled rectifier having its anode and cathode connected in series with said capacitor means and said winding, said rectifier also having a control electrode, a relaxation oscillator circuit including a transistor having an output electrode connected to supply pulses to said control electrode to fire said controlled rectifier, said transistor having an input electrode connected to said A.C. source to supply triggering signals for said oscillator circuit to cause said circuit to emit pulses at a rate which is an integral submultiple of the frequency of A.C. current from said A.C. source, said storage capacitor means being charged by said low voltage power supply during each of the periods between successive firings of said rectifier, and said storage capacitor means discharging through said rectifier and through said winding when said rectifier fires, whereby said transducer emits a pulse of acoustic energy.

5. In an acoustic well logging system of the type comprising a downhole tool for insertion into a partially cased borehole; surface equipment; a cable connected between said downhole tool and said surface equipment; and means cooperating with said cable to raise and lower the tool within the borehole; said downhole tool comprising a source of acoustic wave energy including a transmitting transducer having an energizing winding, and a plurality of receivers spaced from said source in a direction extending longitudinally of the borehole; the improvement which comprises first recording means responsive to signals detected by only one of said receivers for producing a first log as said tool is moved through the cased portion of the borehole, second recording means responsive to signals detected by a pair of said receivers for producing a second log as said tool is moved through the uncased portion of the borehole, means including manually operated switch means in the surface equipment for selectively rendering said first and second recording means operative to produce said first and second logs, whereby a changeover between said first log and said second log may be made from the surface without removing said downhole tool from the borehole, a low voltage D.C. power supply in said downhole tool, an A.C. source in the surface equipment connected via said cable to said low voltage power supply, storage capacitor means connected to said low voltage power supply and in series with said winding, a controlled rectifier having its anode and cathode connected in series with said capacitor means and said winding, said rectifier also having a control electrode, a relaxation oscillator circuit including a transistor having an output electrode connected to supply pulses to said control electrode to fire said controlled rectifier, said transistor having an input electrode connected to said A.C. source to supply triggering signals for said oscillator circuit to cause said circuit to emit pulses at a rate which is an integral submultiple of the frequency of A.C. current from said A.C. source, said storage capacitor means being charged by said low voltage power supply during each of the periods between successive firings of said rectifier, and said storage capacitor means discharging through said rectifier and through said winding when said rectifier fires, whereby said transducer emits a pulse of acoustic energy.

6. In an acoustic well logging system of the type comprising a downhole tool for insertion into a partially cased borehole; surface equipment; a cable connected between said downhole tool and said surface equipment, and means cooperating with said cable to raise and lower the tool within the borehole, said downhole tool comprising a source means for generating a train of spaced acoustic wave pulses and a synchronizing pulse coincident with each acoustic wave pulse, said source means including a transmitting transducer having an energizing winding, and first and second receivers spaced from said source in a direction extending longitudinally of the borehole, the improvement which comprises switching means for rendering said receivers effective, means including a switch operated from the surface for controlling the operation of said switching means selectively to render only the first receiver effective and to render both receivers effective, said surface equipment including a first recording means connected to the cable and responsive to said synchronizing pulses and to the signals detected by said first receiver for producing a first log as said tool is moved through the cased portion of the borehole with said first receiver effective, said surface equipment including second recording means connected to said cable and responsive to the synchronizing pulses and the signals detected by both of said receivers for producing a second log as said tool is moved through the uncased portion of the borehole with both of said receivers effective, means in the surface equipment for selectively rendering said first recording means operative as the downhole tool is moved through the cased portion of the borehole tool and for rendering the second recording means operative as the downhole tool is moved through the uncased portion of the downhole, a low voltage D.C. power supply in said downhole tool, an A.C. source in the surface equipment connected via said cable to said low voltage power supply, storage capacitor means connected to said low voltage power supply and in series with said winding, a controlled rectifier having its anode and cathode connected in series with said capacitor means and said winding, said rectifier also having a control electrode, a relaxation oscillator circuit including a transistor having an output electrode connected to supply pulses to said control electrode to fire said controlled rectifier, said transistor having an input electrode connected to said A.C. source to supply triggering signals for said oscillator circuit to cause said circuit to emit pulses at a rate which is an integral submultiple of the frequency of A.C. current from said A.C. source, said storage capacitor means being charged by said low voltage power supply during each of the periods between successive firing of said rectifier, and said storage capacitor means discharging through said rectifier and through said winding when said rectifier fires, whereby said transducer emits a pulse of acoustic energy.

7. In an acoustic well logging system of the type comprising a downhole tool for insertion into a partially cased borehole; surface equipment; a cable connected between said downhole tool and said surface equipment; and means cooperating with said cable to raise and lower the tool within the borehole; said downhole tool comprising source means for generating a train of acoustic wave pulses and means for generating a synchronizing pulse coincident with each acoustic wave pulse, said source means including a transmitting transducer having an energizing winding, and a plurality of receivers spaced from said source means in a direction extending longitudinally of the borehole; the improvement which comprises first recording means responsive to said synchronizing pulse and to signals detected by only one of said receivers as said tool is moved through the borehole for producing a first curve representing the amplitude of signals arriving at said one receiver from said source means and for producing a second wave representing the travel time of pulses from said source means to said one receiver, thereby to develop a cement bond log for logging the cased portion of the bore hole, second recording means responsive to signals detected by a pair of said receivers for producing a second log as said tool is moved through the uncased portion of the borehole with said pair of receivers effective, means including manually operated switch means in the surface equipment for selectively rendering said first and second recording means operative to produce said cement bond log and said second log, whereby a changeover between said cement bond log and said second log may be made from the surface without removing said downhole tool from the borehole, a low voltage D.C. power supply in said downhole tool, an A.C. source in the surface equipment connected via said cable to said low voltage power supply, storage capacitor means connected to said low voltage power supply and in series with said winding, a controlled rectifier having its anode and cathode connected in series with said capacitor means and said winding, said rectifier also having a control electrode, a relaxation oscillator circuit including a transistor having an output electrode connected to supply pulses to said control electrode to fire said controlled rectifier, said transistor having an input electrode connected to said A.C. source to supply triggering signals for said oscillator circuit to cause said circuit to emit pulses at a rate which is an integral submultiple of the frequency of A.C. current from said A.C. source, said storage capacitor means being charged by said low voltage power supply during each of the periods between successive firings of said rectifier, and said storage capacitor means discharging through said rectifier and through said winding when said rectifier fires, whereby said transducer emits a pulse of acoustic energy.

8. In an acoustic well logging system of the type comprising a downhole tool for insertion into a borehole; surface equipment; a cable connected between said downhole tool and said surface equipment, and means cooperating with said cable to raise and lower the tool within the borehole, said downhole tool comprising a source of acoustic wave energy including a transmitting transducer having an energizing winding, the improvement which comprises at least three receivers spaced from each other and from said source in a direction extending longitudinally of the borehole, switching means in the downhole tool for rendering said receivers effective, means including a switch operated from the surface for controlling the operation of said switching means selectively to render effective any one of said receivers and also selectively to render effective any two of said receivers, a low voltage D.C. power supply in said downhole tool, an A.C. source in the surface equipment connected via said cable to said low voltage power supply, storage capacitor means connected to said low voltage power supply and in series with said winding, a controlled rectifier having its anode and cathode connected in series with said capacitor means and said winding, said rectifier also having a control electrode, a relaxation oscillator circuit including a transistor having an output electrode connected to supply pulses to said control electrode to fire said controlled rectifier, said transistor having an input electrode connected to said A.C. source to supply triggering signals for said oscillator circuit to cause said circuit to emit pulses at a rate which is an integral submultiple of the frequency of A.C. current from said A.C. source, said storage capacitor means being charged by said low voltage power supply during each of the periods between successive firings of said rectifier, and said storage capacitor means discharging through said rectifier and through said winding when said rectifier fires, whereby said transducer emits a pulse of acoustic energy.

9. In an acoustic well logging system of the type comprising a downhole tool for insertion into a borehole; surface equipment; a cable connected between said downhole tool and said surface equipment; means cooperating with said cable to raise and lower the tool within the borehole; said downhole tool comprising a source of acoustic wave energy including a transmitting transducer having an energizing winding, and a plurality of receivers spaced from each other and from said source in a direction extending longitudinally of the borehole; and translating means including an amplifier in the downhole tool and said cable for transmitting signals detected by said receivers from said downhole tool to said surface equipment, the improvement which comprises first switching means in the downhole tool for rendering said translating means effective, means including a first manually operated switch operated from the surface for sending a first signal via said cable to control the operation of said switching means, means in the downhole tool for changing the gain of said amplifier in steps and including a second switching means, means including a second manually operated switch operated from the surface for sending a second signal via said cable to control the operation of said second switching means, a low voltage D.C. power supply in said downhole tool, an A.C. source in the surface equipment connected via said cable to said low voltage power supply, storage capacitor means connected to said low voltage power supply and in series with said winding, a controlled rectifier having its anode and cathode connected in series with said capacitor means and said winding, said rectifier also having a control electrode, a relaxation oscillator circuit including a transistor having an output electrode connected to supply pulses to said control electrode to fire said controlled rectifier, said transistor having an input electrode connected to said A.C. source to supply triggering signals for said oscillator circuit to cause said circuit to emit pulses at a rate which is an integral submultiple of the frequency of A.C. current from said A.C. source, said storage capacitor means being charged by said low voltage power supply during each of the periods between successive firings of said rectifier, and said storage capacitor means discharging through said rectifier and through said winding when said rectifier fires, whereby said transducer emits a pulse of acoustic energy.

10. In an acoustic well logging system of the type comprising a downhole tool for insertion into a borehole; surface equipment; a cable connected between said downhole tool and said surface equipment; and means cooperating with said cable to raise and lower the tool within the borehole; said downhole tool comprising a source of acoustic wave energy including a transmitting transducer having an energizing winding, and a plurality of receivers spaced from said source in a direction extending longitudinally of the borehole; the improvement which comprises first recording means responsive to signals detected by only one of said receivers for producing a first log as said tool is moved through the borehole, second recording means responsive to signals detected by a pair of said receivers for producing a second log as said tool is moved through the borehole, means including manually operated switch means in the surface equipment for selectively rendering said first and second recording means operative to produce said first and second logs, whereby a changeover between said first log and said second log may be made from the surface without removing said downhole tool from the borehole, a low voltage D.C. power supply in said downhole tool, an A.C. source in the surface equipment connected via said cable to said low voltage power supply and in series with said winding, a controlled rectifier having its anode and cathode connected in series with said capacitor means and said winding, said rectifier also having a control electrode, a relaxation oscillator circuit including a transistor having an output electrode connected to supply pulses to said control electrode to fire said controlled rectifier, said transistor having an input electrode connected to said A.C. source to supply triggering signals for said oscillator circuit to cause said circuit to emit pulses at a rate which is an integral submultiple of the frequency of A.C. current from said A.C. source, said storage capacitor means being charged by said low voltage power supply during each of the periods between successive firings of said rectifier, and said storage capacitor means discharging through said rectifier and through said winding when said rectifier fires, whereby said transducer emits a pulse of acoustic energy.

11. In an acoustic well logging system of the type comprising a downhole tool for insertion into a borehole; surface equipment; a cable connected between said downhole tool and said surface equipment; and means cooperating with said cable to raise and lower the tool within the borehole, said downhole tool comprising a source of acoustic wave energy including a transmitting transducer having an energizing winding, and a plurality of receivers spaced from said source in a direction extending longitudinally of the borehole; the improvement which comprises switching means for rendering said receivers effective, means including a switch operated from the surface for controlling the operation of said switching means selectively to render only one of said receivers effective or to render a pair of said receivers effective, said surface equipment including a first recording means connected to the cable for producing a first log as said tool is moved through the borehole with said one receiver effective, said surface equipment including second recording means connected to said cable for producing a second log as said tool is moved through the borehole with said pair of receivers effective, and means in the surface equipment for selectively rendering said first and second recording means operative, a low voltage D.C. power supply in said downhole tool, an A.C. source in the surface equipment connected via said cable to said low voltage power supply, storage capacitor means connected to said low voltage power supply and in series with said winding, a controlled rectifier having its anode and cathode connected in series with said capacitor means and said winding, said rectifier also having a control electrode, a relaxation oscillator circuit including a transistor having an output electrode connected to supply pulses to said control electrode to fire said controlled rectifier, said transistor having an input electrode connected to said A.C. source to supply triggering signals for said oscillator circuit to cause said circuit to emit pulses at a rate which is an integral submultiple of the frequency of A.C. current from said A.C. source, said storage capacitor means being charged by said low voltage power supply during each of the periods between successive firings of said rectifier, and said storage capacitor means discharging through said rectifier and through said winding when said rectifier fires, whereby said transducer emits a pulse of acoustic energy.

12. In an acoustic well logging system of the type comprising a downhole tool for insertion into a borehole; surface equipment, a cable connected between said downhole tool and said surface equipment; and means cooperating with said cable to raise and lower the tool within the borehole said downhole tool comprising a source of acoustic wave energy including a transmitting transducer having an energizing winding, and at least three receivers spaced from said source in a direction extending longitudinally of the borehole; the improvement which comprises selectively operated switching means in the downhole tool for rendering said receivers individually effective one at a time and for rendering different pairs of said receivers effective, means including a first manually operated switch means at the surface for transmitting a control signal via said cable to said switching means to control the selective operation thereof, first recording means responsive to signals detected by only one of said receivers for producing a first log as said tool is moved through the borehole, second recording means responsive to signals detected by the effective pair of said receivers for producing a second log as said tool is moved through the borehole with a pair of said receivers effective, means including a second manually operated switch means in the surface equipment for selectively rendering said first and second recording means operative to produce said first and second logs, whereby a changeover from said first log to said second log may be made from the surface without removing said downhole tool from the borehole, said first switching means being operated to change the effective receivers in order to change the log characteristics of either of said logs without removing the downhole tool from the borehole, a low voltage D.C. power supply in said downhole tool, an A.C. source in the surface equipment connected via said cable to said low voltage power supply, storage capacitor means connected to said low voltage power supply and in series with said winding, a controlled rectifier having its anode and cathode connected in series with said capacitor means and said winding, said rectifier also having a control electrode, a relaxation oscillator circuit including a transistor having an output electrode connected to supply pulses to said control electrode to fire said controlled rectifier, said transistor having an input electrode connected to said A.C. source to supply triggering signals for said oscillator circuit to cause said circuit to emit pulses at a rate which is an integral submultiple of the frequency of A.C. current from said A.C. source, said storage capacitor means being charged by said low voltage power supply during each of the periods between successive firings of said rectifier, and said storage capacitor means discharging through said rectifier and through said winding when said rectifier fires, whereby said transducer emits a pulse of acoustic energy.

13. In an acoustic well logging system of the type comprising a downhole tool for insertion into a borehole; surface equipment; a cable connected between said downhole tool and said surface equipment; means cooperating with said cable to raise and lower the tool within the borehole; said downhole tool comprising a source of acoustic wave energy including a transmitting transducer having an energizing winding, and at least three receivers spaced from said source in a direction extending longitudinally of the borehole; and translating means including said cable for transmitting signals detected by said receivers from said downhole tool to said surface equipment, the improvement which comprises switching means for rendering said translating means effective, means including a switch operated from the surface for controlling the operation of said switching means to selectively render the translating means effective to transmit the signals detected by any one of said receivers and to selectively render the translating means effective to transmit the signals detected by any pair of said receivers, said surface equipment including a first recording means connected to the cable for producing a first log as said tool is moved through the borehole with said translating means effective to transmit signals detected by only one receiver, said surface equipment including second recording means connected to said cable for producing a second log as said tool is moved through the borehole with said translating means effective to transmit signals detected by a pair of said receivers, means in the surface equipment for selectively rendering said first and second recording means operative, a low voltage D.C. power supply in said downhole tool, an A.C. source in the surface equipment connected via said cable to said low voltage power supply, storage capacitor means connected to said low voltage power supply and in series with said winding, a controlled rectifier having its anode and cathode connected in series with said capacitor means and said winding, said rectifier also having a control electrode, a relaxation oscillator circuit including a transistor having an output electrode connected to supply pulses to said control electrode to fire said controlled rectifier, said transistor having an input electrode connected to said A.C. source to supply triggering signals for said oscillator circuit to cause said circuit to emit pulses at a rate which is an integral submultiple of the frequency of A.C. current from said A.C. source, said storage capacitor means being charged by said low voltage power supply during each of the periods between successive firings of said rectifier, and said storage capacitor means discharging through said rectifier and through said winding when said rectifier fires, whereby said transducer emits a pulse of acoustic energy.

14. A method for logging a partially cased borehole comprising the steps of moving a downhole tool through said borehole via a cable connected between said downhole tool and the surface, emitting acoustic wave energy from a source carried by said downhole tool, detecting said energy at a plurality of receiving points spaced from said source in a direction extending longitudinally of the borehole, producing from the energy detected at only one of said receiving points a first log as said tool is moved through the cased portion of the borehole, producing from the energy detected at at least two of said receiving points a second log as said tool is moved through the uncased portion of the borehole, selectively transmitting a signal from the surface via said cable to the downhole tool, and utilizing the latter signal in the downhole tool to render the receiving points selectively effective to produce said logs whereby a changeover between said first log and said second log is made from the surface without removing said downhole tool from the borehole.

15. A method for logging a partially cased borehole comprising the steps of moving a downhole tool through said borehole via a cable connected between said downhole tool and the surface, emitting a train of spaced acoustic wave pulses from a source carried by said downhole tool, generating a synchronizing pulse from each of said acoustic wave pulses, detecting said acoustic wave pulses at a plurality of receiving points spaced from said source in a direction extending longitudinally of the borehole, producing from the pulses detected at only one of said receiving points a first log as said tool is moved through the cased portion of the borehole, producing from said synchronizing pulses and the pulses detected at at least two of said receiving points a second log as said tool is moved through the uncased portion of the borehole, selectively transmitting a signal from the surface via said cable to the downhole tool, and utilizing the latter signal in the downhole tool to render the receiving points selectively effective to produce said logs whereby a changeover between said first log and said second log is made from the surface without removing said downhole tool from the borehole.

16. A method for logging a partially cased borehole comprising the steps of moving a downhole tool through said borehole via a cable connected between said downhole tool and the surface, emitting a train of spaced acoustic wave pulses from a source carried by said downhole tool, generating a synchronizing pulse for each of said acoustic pulses, detecting said acoustic wave pulses at a plurality of receiving points spaced from said source in a direction extending longitudinally of the borehole, producing from the pulses detected at only one of said receiving points a first log representing the amplitude of the detected pulses as said tool is moved through the cased portion of the borehole and simultaneously producing a second log from the synchronizing pulses and the pulses detected at said one receiving point proportional to the travel time of said acoustic wave pulses from the source to said one receiving point, producing from the synchronizing pulses and the acoustic wave pulses detected at at least two of said receiving points a third log proportional to the difference in travel times of the pulses between the latter two receiving points as said tool is moved through the uncased portion of the borehole, selectively transmitting a signal from the surface via said cable to the downhole tool, and utilizing the latter signal in the downhole tool to render the receiving points selectively effective to produce said logs whereby a changeover between said first and second logs and said third log is made from the surface without removing said downhole tool from the borehole.

17. A method for logging a partially cased borehole comprising the steps of moving a downhole tool through said borehole via a cable connected between said downhole tool and the surface, emitting a train of spaced acoustic wave pulses from a source carried by said downhole tool, generating a synchronizing pulse for each of said acoustic pulses, detecting said acoustic wave pulses at a plurality of receiving points spaced from said source in a direction extending longitudinally of the borehole, producing from the pulses detected at only one of said receiving points a first log representing the amplitude of the detected pulses as said tool is moved through the cased portion of the borehole and simultaneously producing from the synchronizing pulses and from the pulses detected at said one receiving point a second log proportional to the travel time of said acoustic wave pulses from the source to said one receiving point, producing from the synchronizing pulses and the acoustic wave pulses detected at at least two of said receiving points a third log proportional to the difference in travel times of the pulses between the latter two receiving points as said tool is moved through the uncased portion of the borehole, selectively transmitting a signal from the surface via said cable to the downhole tool, and utilizing the latter signal in the downhole tool to render the receiving points selectively effective to produce said logs whereby a changeover between said first and second logs and said third log is made from the surface without removing said downhole tool from the borehole.

18. A method for logging a partially cased borehole having cement disposed between the casing and the borehole in the cased area, said method comprising the steps of moving a downhole tool through said borehole via a cable connected between said downhole tool and the surface, emitting a train of spaced acoustic wave pulses from a source carried by said downhole tool, generating a synchronizing pulse for each of said acoustic pulses, detecting said acoustic wave pulses at a plurality of receiving points spaced from said source in a direction extending longitudinally of the borehole, producing from the pulses detected at only one of said receiving points a first log representing the amplitude of the detected pulses as said tool is moved through the cased portion of the borehole and simultaneously producing from the synchronizing pulses and from the pulses detected at said one receiving point a second log proportional to the travel time of said acoustic wave pulses from the source to said one receiving point, orienting said first and second logs side by side with common depth points aligned to facilitate comparison to determine the quality of the cement bond in said cased area, producing from the synchronizing pulses and the acoustic wave pulses detected at at least two of said receiving points a third log proportional to the difference in travel times of the pulses between the latter two receiving points as said tool is moved through the uncased portion of the borehole, selectively transmitting a signal from the surface via said cable to the downhole tool, and utilizing the latter signal in the downhole tool to render the receiving points selectively effective to produce said logs whereby a changeover between said first and second logs and said third log is made from the surface without removing said downhole tool from the borehole.

References Cited by the Examiner

UNITED STATES PATENTS

| | | | |
|---|---|---|---|
| 3,022,488 | 2/1962 | Stripling | 181—.5 |
| 3,096,502 | 7/1963 | Vogel | 181—.5 |
| 3,148,352 | 9/1964 | Summers | 181—.5 |
| 3,149,304 | 9/1964 | Summers | 181—.5 |
| 3,186,223 | 6/1965 | Wilson | 181—.5 |
| 3,187,301 | 6/1962 | Summers | 181—.5 |
| 3,208,548 | 9/1965 | Levin et al. | 181—.5 |
| 3,212,598 | 10/1965 | Anderson | 181—.5 |
| 3,216,524 | 11/1965 | Summers | 181—.5 |

BENJAMIN A. BORCHELT, *Primary Examiner.*

R. M. SKOLNIK, *Assistant Examiner.*